US011249891B1

(12) United States Patent
Patel-Schneider et al.

(10) Patent No.: US 11,249,891 B1
(45) Date of Patent: Feb. 15, 2022

(54) MACHINE-LEARNING FRAMEWORK FOR TESTING FEEDBACK CONTROLLER ROBUSTNESS

(71) Applicant: Palo Alto Research Center Incorporated, Palo Alto, CA (US)

(72) Inventors: Peter Patel-Schneider, Westfield, NJ (US); Ion Matei, Sunnyvale, CA (US); Alexandre Perez, San Mateo, CA (US); Ron Zvi Stern, Palo Alto, CA (US); Johan de Kleer, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/208,647

(22) Filed: Mar. 22, 2021

(51) Int. Cl.
*G06F 9/44* (2018.01)
*G06F 11/36* (2006.01)
*G06N 3/08* (2006.01)
*G06N 3/04* (2006.01)
*G06F 40/47* (2020.01)
*G06F 8/53* (2018.01)
*G06F 8/41* (2018.01)

(52) U.S. Cl.
CPC ............ *G06F 11/3688* (2013.01); *G06F 8/44* (2013.01); *G06F 8/53* (2013.01); *G06F 11/3684* (2013.01); *G06F 40/47* (2020.01); *G06N 3/0427* (2013.01); *G06N 3/08* (2013.01)

(58) Field of Classification Search
CPC ........ G06F 11/3688; G06F 40/47; G06F 8/44; G06F 8/53; G06F 11/3684; G06N 3/0427; G06N 3/08
See application file for complete search history.

(56) References Cited

U.S. PATENT DOCUMENTS

| 11,060,504 B1* | 7/2021 | Virani ..................... F03D 7/047 |
| 2015/0309920 A1* | 10/2015 | Ishigooka ........... G06F 11/3608 717/126 |
| 2020/0379956 A1* | 12/2020 | Mendo Hernandez ..................... G06F 16/1873 |

OTHER PUBLICATIONS

Uwe Pohlmann, "Generating Functional Mockup Units from Software Specications", Sep. 3-5, 2012, Proceedings of the 9th International Modelica Conference.*
T. Blochwitz, "Functional Mockup Interface 2.0: The Standard for Tool independent Exchange of Simulation Models", Sep. 3-5, 2012, Proceedings of the 9th International Modelica Conference.*
Bernhard Thiele, "Using the Functional Mockup Interface as an Intermediate Format in AUTOSAR Software Component Development", Published 2011, Linköping Electronic Conference Proceedings.*

* cited by examiner

*Primary Examiner* — Wei Y Zhen
*Assistant Examiner* — Amir Soltanzadeh
(74) *Attorney, Agent, or Firm* — Womble Bond Dickinson (US) LLP

(57) ABSTRACT

A method includes receiving a subject-matter expert (SME) interpretable model. The method further includes converting, by a processing device, the SME interpretable model into a functional mockup unit (FMU). The method further includes integrating the FMU into a control software project (CSP). The method further includes compiling the CSP into binary code.

17 Claims, 6 Drawing Sheets

MACHINE-LEARNING FRAMEWORK FOR TESTING FEEDBACK CONTROLLER ROBUSTNESS

TECHNICAL FIELD

Implementations of the present disclosure relate to machine-learning frameworks, and more particularly to machine-learning frameworks for testing the robustness of feedback controllers against reconstruction from binary files.

BACKGROUND

Machine learning is a field of artificial intelligence (AI) that provides systems the ability to automatically learn and improve from experience without being explicitly programmed. Machine learning focuses on the development of computer programs that can access data and use it to learn for themselves. The process of learning begins with observations or data, such as examples, direct experience, or instruction, in order to look for patterns in data and make better decisions in the future based on provided examples. The primary aim is to allow the computers to learn automatically without human intervention or assistance and adjust actions accordingly.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
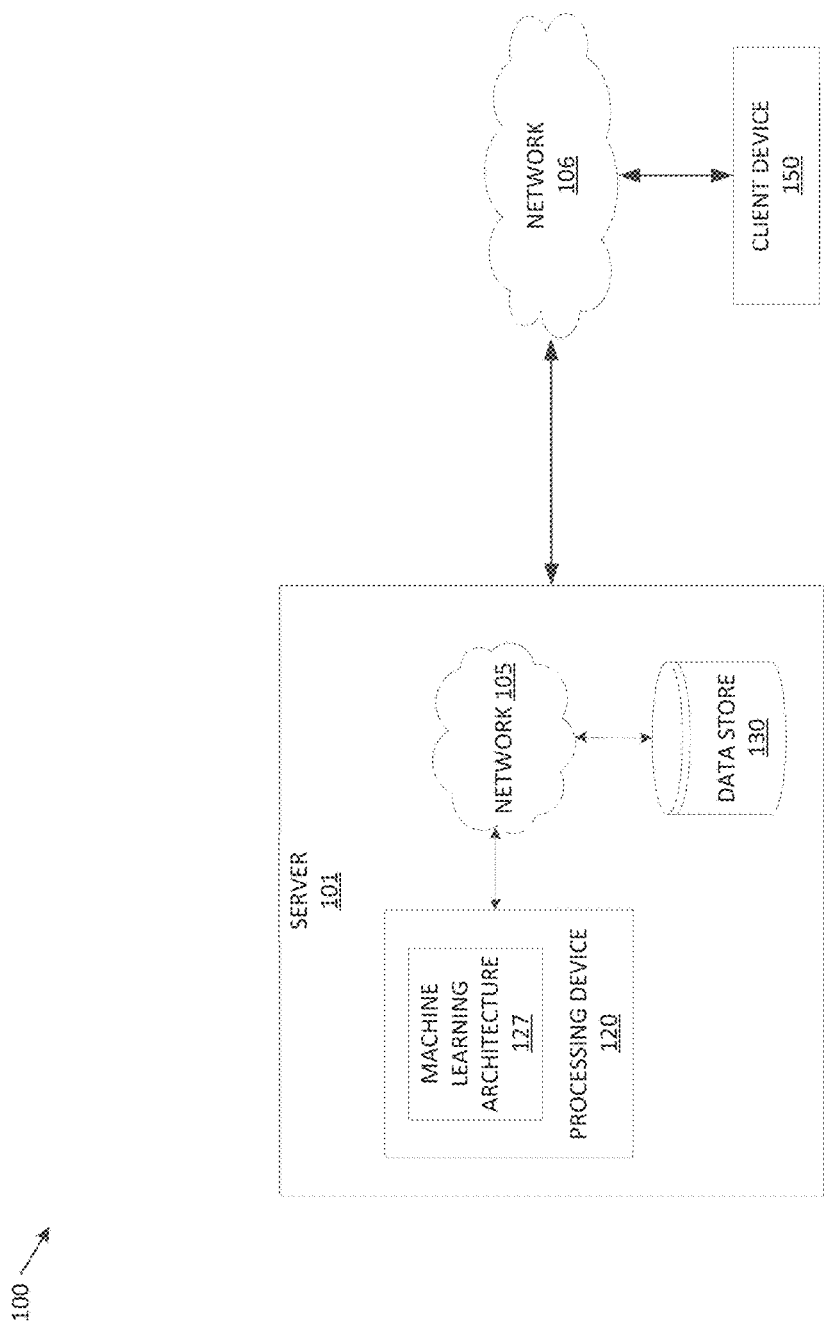
FIG. 1 is a diagram showing a machine learning system for use with implementations of the present disclosure.

Methods and systems related to machine-learning frameworks for testing the robustness of feedback controllers against reconstruction from binary files are described herein. The machine learning (ML)-based framework described herein automatically solves the problem of reconstructing controller models (e.g., proportional-integral-derivative (PID) and variants, or state-space controller) from binary code, in a format that is interpretable by subject matter experts (SMEs). In one embodiment, interpretability speaks to the extraction of insights for a particular audience into a chosen domain problem about domain relationships contained in a data or model. Worth noting, although two example computing architectures (a Matrice 100 quadcopter based on Intel x86 CPU architecture and a TurtleBot 3 Waffle Pi ground robot based on ARM CPU architecture) are considered herein merely for convenience and brevity, any other suitable architectures are contemplated. The SMEs may be considered to be robotics and control engineers in the context described herein, or any other suitably-experienced personnel.

Furthermore, SME-interpretable models may be represented using the Modelica language merely as a non-limiting example of any other suitable SME-interpretable model. The benefits of using Modelica are twofold: 1) Modelica is a popular language for describing control algorithms, supported by open-source modeling tools (e.g., OpenModelica or JModelica) and 2) Modelica enables the code generation process of translating a model to binaries, since Modelica models can be mapped automatically into the C++ programming language through the Functional Mockup Interface (FMI) standard. FMI is a standard that defines a container and an interface to exchange dynamic models.

Given the widespread support of the FMI standard, Modelica may easily be replaced with a proprietary language such as Matlab/Simulink. Advantageously, the rest of the processes for model reconstructions remain unchanged. The Simulink models have a well understood grammar and can be converted into FMUs similar to Modelica models. In the reconstruction process, the step that is the most dependent on the choice of computing architecture may be the decompilation step. The choice of architecture described herein may be directed in part by the availability of open source decompilers. The model reconstruction approaches can be repurposed for other computing architectures provided a decompiler is available. For example, PLC binary code can be reconstructed using the proprietary JEB Decompiler for S7 PLC to generate source code. Training data generation in this case would require an additional step, where FMUs are integrated into Simulink models and converted into PLC source code (e.g., Structured Text Language), and further converted into binary code (e.g., MC7 code).

The mapping outputs are Functional Mockup Units (FMUs) expressed as C++ source code, which encodes the controller behavior. In general, source code may be generated using decompilers: tools that reverse-engineer binary code to derive a source code in a higher-level programming language. Decompilers employ data flow analysis algorithms to identify function parameters and return values, recover high-level expressions, and identify standard control structures using graph structuring algorithms. Decompiled code is notoriously difficult to comprehend, however, as it lacks high-level mathematical semantics.

In addition, not all generated source code is useful for the SMEs, e.g., code related to input/output (I/O) operations from/to sensors/actuators. Some purely data-driven embodiments address model learning use genetic programming (GP) to learn physical laws by discovering operators between variables and their derivatives. These approaches do not scale with the problem size, are sensitive to noisy data, and do not often contain interpretable semantics. More recent model learning approaches use regression parameterizations that learn sparse models; they require manually engineered features and are sensitive to noisy data. The drawbacks of these approaches are that they require experimental data and do not guarantee an SME-interpretable format.

The present disclosure overcomes the above problems, and others, by describing methods and systems related to machine-learning frameworks for testing the robustness of feedback controllers against reconstruction from binary files. Specifically, the methods and systems described herein overcome the above problems, and others, by generating a dataset through code generation processes, provide the model reconstruction algorithms (e.g., using natural language processing inspired transformers), and enable extensions to different SME interpretable modeling languages and computational architectures.

Advantageously, the ability to reconstruct controller models has positive implications on the security of control systems. Arguably, a simple but effective way to destabilize a physical process is to change the parameters of the control algorithm. The availability of the control algorithm and of the model of the physical process provide the necessary information to make such changes. In addition, controller reconstruction is an avenue for gaining access to trade secrets (i.e., proprietary information about control techniques). The systems and methods described herein act as a platform for testing the robustness of control algorithms used in any manner of environments against reconstruction and associated security breaches.

FIG. 1 is a diagram showing a machine learning system 100 for use with implementations of the present disclosure. Although specific components are disclosed in machine learning system 100, it should be appreciated that such components are examples. That is, embodiments of the present invention are well suited to having various other components or variations of the components recited in machine learning system 100. It is appreciated that the components in machine learning system 100 may operate with other components than those presented, and that not all of the components of machine learning system 100 may be required to achieve the goals of machine learning system 100.

In one embodiment, system 100 includes server 101, network 106, and client device 150. Server 100 may include various components, which may allow for using multiple trained models to reduce data labeling efforts on a server device or client device. Each component may perform different functions, operations, actions, processes, methods, etc., for a web application and/or may provide different services, functionalities, and/or resources for the web application. Server 100 may include machine learning architecture 127 of processing device 120 to perform operations related to using multiple trained models to reduce data labeling efforts. In one embodiment, processing device 120 comprises one or more graphics processing units of one or more servers (e.g., including server 101). Additional details of machine learning architecture 127 are provided with respect to FIGS. 2-6. Server 101 may further include network 105 and data store 130.

The processing device 120 and the data store 130 are operatively coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc. The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The server 100 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

As discussed herein, the server 101 may provide machine learning functionality to a client device (e.g., client device 150). In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 100. Further implementation details of the operations performed by system 101 are described with respect to FIGS. 2-6.

Figure 2:
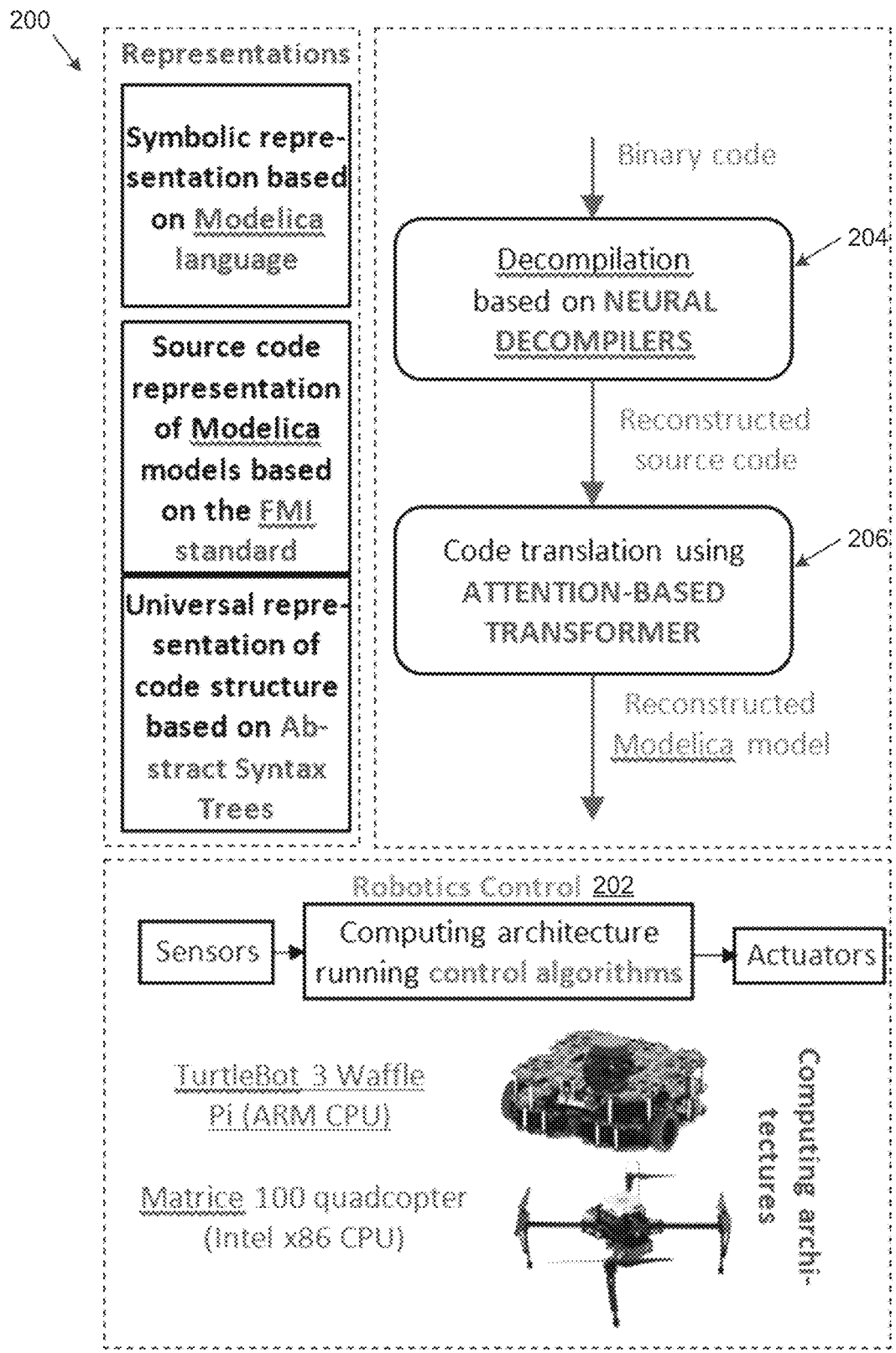
FIG. 2 is a graphical diagram showing examples of machine-learning frameworks for testing the robustness of feedback controllers against reconstruction from binary files, in accordance with some embodiments.

FIG. 2 is a graphical diagram 200 showing examples of machine-learning frameworks for testing the robustness of feedback controllers against reconstruction from binary files, in accordance with some embodiments. In one embodiment, as described above, the ML-based framework described herein automatically solves the problem of reconstructing controller models from binary code, in a format that is interpretable by SMEs.

Worth repeating, SME-interpretable models are represented herein using the Modelica language merely as a non-limiting example of any other suitable SME-interpretable model. The mapping outputs are FMUs expressed as C++ source code, which encodes controller behavior.

In one embodiment, FMUs may be embedded into control software projects (CSPs), where input/output (I/O) operations for interacting with sensors and actuators are also implemented. For the robotics application 202, the CSP may be based on a combination of platform onboard Software Development Kit (SDK) and the Robot Operating System (ROS), a collection of frameworks for developing the software architecture of robotic systems.

Figure 3:
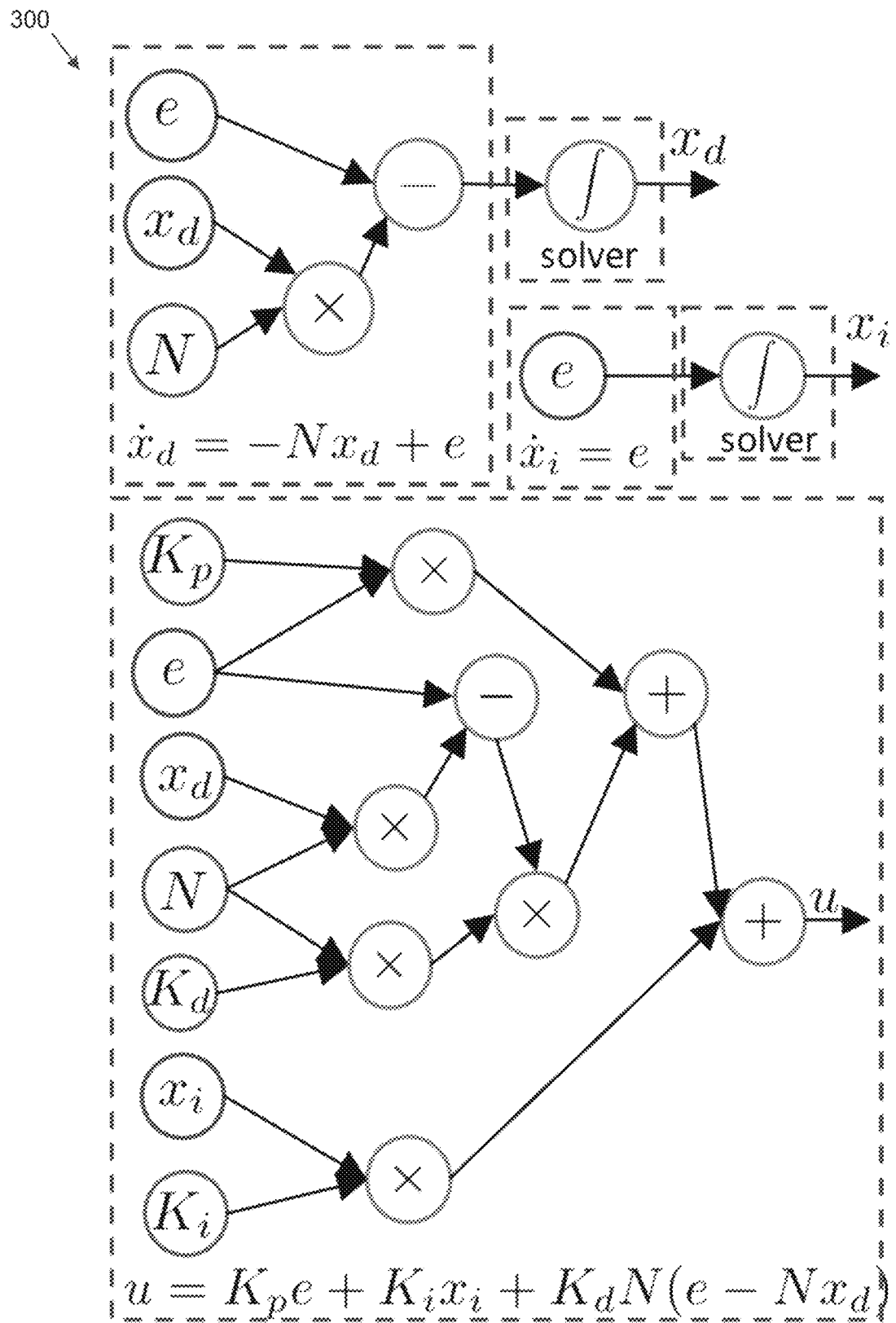
FIG. 3 is a graphical diagram showing a method of training data generation, in accordance with some embodiments.

The ability to execute the code generation process is key to the approach described herein for model reconstruction. In one embodiment, a machine learning (ML)-neural-decompiler 204 may be used to transform binary code into readable, high-level C/C++ code. The low-level Abstract Syntax Trees (ASTs) corresponding to this C/C++ code may be processed by a natural language processing (NLP)-inspired transformer 206 for AST-to-AST translations. The transformer may produce the high-level AST, respecting the Modelica language grammar that encodes the controller symbolic description. The resulting Modelica ASTs may be translated into Modelica models and may be automatically checked for consistency (e.g., syntax correctness, consistent number of equations and variables). FIG. 3 illustrates a collection of symbolic ASTs corresponding to the mathematical primitives of the state-space representation of the PID controller.

In one embodiment, the ML-based approach described herein may use quantitative metrics (e.g., Mean Square Error (MSE) loss function) to check the closeness between simulated outputs of models, and qualitative metrics (e.g., the negative of the log likelihood (NLL) loss function) to check if the sequences corresponding to two ASTs are the same. To automatically generate training data, processing logic may use open source Modelica libraries of components whose FMUs may be included in CSPs and converted into binary code. This initial training corpus may be automatically augmented by re-generating the Modelica models with randomized order of parameters, variables and equations by means of a Modelica parser. Advantageously, this process may result in new and distinct source and binary code that may be added to the training.

Figure 4:
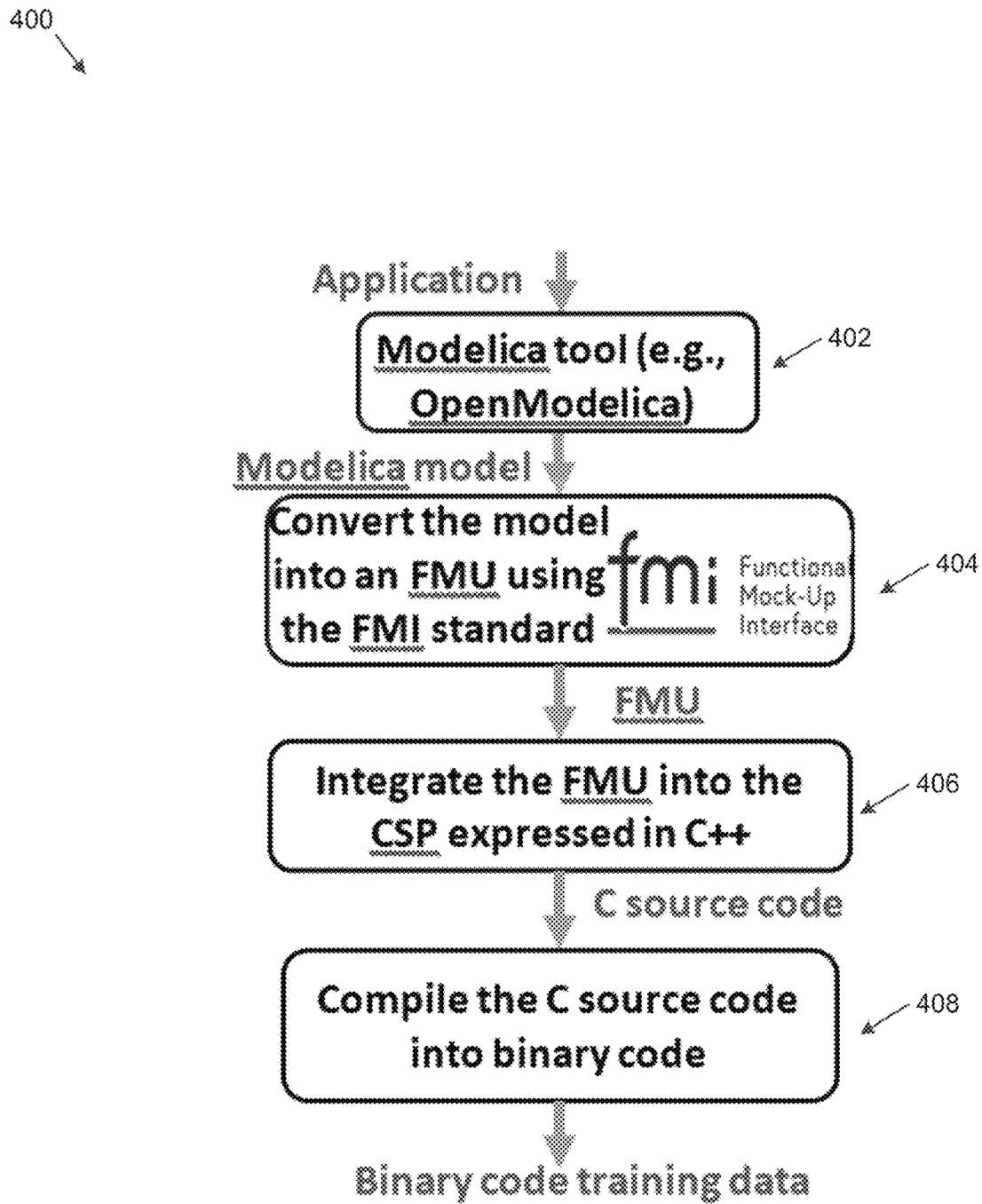
FIG. 4 is a graphical diagram showing a first method of machine-learning frameworks for testing the robustness of feedback controllers against reconstruction from binary files, in accordance with some embodiments.

FIG. 4 is a graphical diagram showing a first method of machine-learning frameworks for testing the robustness of feedback controllers against reconstruction from binary files, in accordance with some embodiments. For example, the processes described with reference to FIG. 4 may be performed by processing logic of machine learning architecture 127 as described with reference to FIG. 1.

In one embodiment, a dataset may be required to develop and evaluate the proposed approaches for model reconstruction. Each sample of the dataset starts with a Modelica model, goes through the intermediary representation (low- and high-level source code ASTs), and ends in executable binaries. Modelica enables using off-the-shelf open-source tools to generate FMUs and eventually a C++ function for each equation of the Modelica model.

In one embodiment, the algorithms used for controlling robotic platforms are instances of a small number of controller types, such as PID controllers or state-based controllers. These types are insufficient to generate large data sets and obtaining a large and diverse set of Modelica models for these domains is challenging. However, since the control algorithms can be represented as I/O dynamical systems (e.g., ODEs, transfer functions), we can include any type of dynamical system that matches the I/O interface structure of the control algorithm. By using Modelica, access is provided to many examples of dynamical systems that are not natively causal I/O models (in the thousands) but that can still be used for generating a relevant dataset. Moreover, Modelica shares syntactical similarities with commercial tools that are commonly used in industry and academia for control applications (e.g. Matlab/Simulink).

Another key intermediate representation is the FMU that describes the mathematical model of a dynamical system as C++ code. FMUs implement the FMI standard that is supported by more than 100 modeling and simulation tools. Such tools include both commercial and free tools using the Modelica language (e.g., OpenModelica, JModelica, Dymola). Consequently, source code can automatically be generated corresponding to Modelica models that is included in CSPs. Such technologies enable the automatic generation of new Modelica models with randomized order of variables, parameters and equations, leading to a factorial increase in the number of training examples.

To integrate Modelica models into CSPs expressed in high-level programming languages FMUs that are objects incapsulating the Modelica model behavior using C++ source code may be employed. In addition to the controller behavior, the CSPs may include I/O and/or timing or scheduling operations. FMU objects may be key components for generating training data, since they can be generated not only from Modelica models but also from Matlab/Simulink models. Hence, if necessary, access to thousands of examples that can be added to the training set is available.

The embodiments described herein for generating training data is summarized in FIG. 4. It may appear that since the focus is on controllers, the number of training samples is limited. For training purpose however, the functionality of the FMU is not relevant, hence models available in the Modelica Standard Library (MLS) components, in-house developed models during execution of government and commercial projects, and open-source Modelica GitHub projects that can be harvested over the Internet may be utilized.

In addition, by using different modeling tools to automatically generate FMUs (e.g., OpenModelica, Dymola, JModelica) and by changing the order of the parameters, variables, and equations in the Modelica models, several non-identical FMUs for the same Modelica model may be generated. The simplest state-space PID Modelica model may have three equations and using three tools to generate FMUs and by permuting the equation order, results in 18 FMU samples that encode the same model. The controller source code on the hardware platforms may be transferred using ROS that communicates with the SDK running onboard through an SDK-ROS interface. The quadcopter and ground robot (see FIG. 2) may come with open source hardware, software, and decompilers. The feasibility of designing and running customized control algorithms for Matrice 100 quadcopters using a combination of ROS and onboard SDK has been successfully demonstrated, and open-source ROS derived implementations have also been demonstrated on the Turtlebot. The data set of examples may include tuples of the form (Modelica code, C++ FMU code, platform onboard C/C++ code, binary code).

Referring to FIG. 4, at block 402, processing logic receives a subject-matter expert (SME) interpretable model. In one embodiment, the SME interpretable model is based on a Modelica language. In other embodiments, other languages, such as Matlab and Simulink may be used. At block 404, processing logic coverts, by a processing device, the SME interpretable model into a functional mockup unit (FMU). In one embodiment, to convert the SME interpretable model into the FMU, processing logic may use a functional mockup interface (FMI) standard, as described herein.

At block 406, processing logic integrates the FMU into a control software project (CSP). In one embodiment, the CSP is expressed in C++ source code. In other embodiments, any other suitable high-level code may be used. At block 408, processing logic compiles the CSP into binary code. In one embodiment, processing logic may optionally provide the binary code as training data to a machine learning model trained to reconstruct feedback controller firmware, which is further described with respect to FIG. 5.

Figure 5:
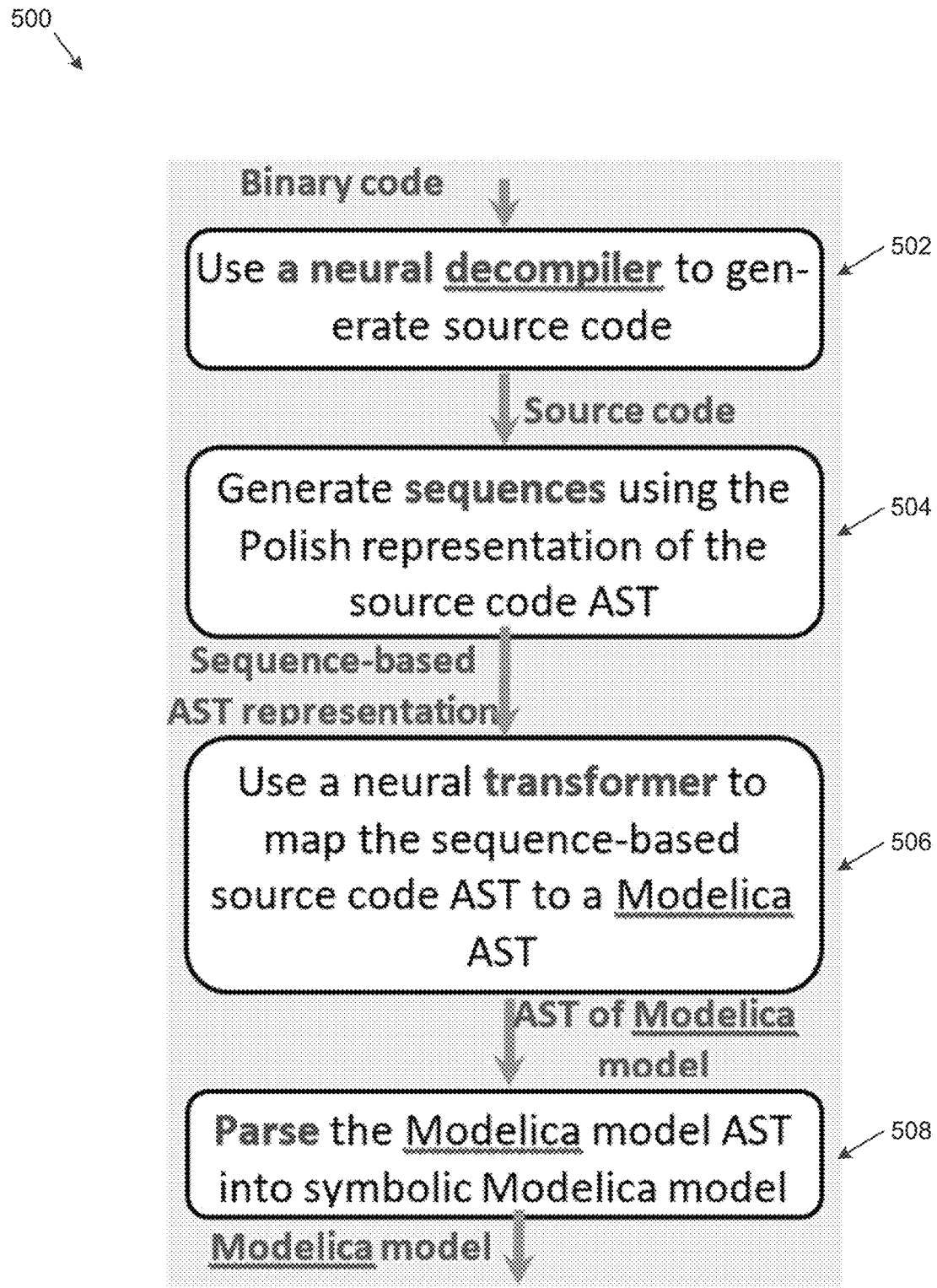
FIG. 5 is a graphical diagram showing a second method of machine-learning frameworks for testing the robustness of feedback controllers against reconstruction from binary files, in accordance with some embodiments.

FIG. 5 is a graphical diagram 500 showing a second method of machine-learning frameworks for testing the robustness of feedback controllers against reconstruction from binary files, in accordance with some embodiments. For example, the processes described with reference to FIG. 5 may be performed by processing logic of machine learning architecture 127 as described with reference to FIG. 1.

Conventional decompilers cannot always preserve the correct functionality of the input binary. In addition, their output often looks very different from the original source program making it difficult to interpret. To address these problems, a neural decompiler may produce better structured code as compared to standard decompilers and preserve the modules of the program may be utilized. In one embodiment, the decompiler may be pre-trained on general source code and fine-tuned on code derived from CSP projects, reducing the training needed on CSP code. The output from the neural decompiler may be processed by a neural transformer to produce the high-level Modelica ASTs.

The process for model synthesis using an NLP-inspired neural approach is shown in FIG. 5. A system comprised of a neural transformer-based decompiler, followed by a transformer-based translator from source code to Modelica models is described herein. Separate tasks may be used both to reduce the training required and to reuse parts of the system when changing compilers or SME languages.

Neural decompilation may produce results that look more like source code used to train the system. This similarity with the source code previously used may improve the performance of the rest of the system over using a variety of decompilation methods. Models of moderate size may be employed, as they have been shown to be effective on these kinds of tasks. A polish representation for ASTs may be used, as such may be easier for non-tree neural models to process. In one embodiment, a byte representation of binary code and tokenized source code may also be used. The translator may strip the AST of irrelevant code (e.g., I/O calls) and generate a Modelica-compatible AST.

In one embodiment, the training data for the neural decompiler and translator may be the inputs, intermediate steps, and outputs of the process in FIG. 4. In one example, several hundred thousand examples generated by instantiating and perturbing existing control projects (e.g., by randomly re-writing the order of equations of the Modelica models) may be used. To improve performance of the system, pre-training may be performed using general formulae and source code. The loss function may be based on 1) syntactic closeness (e.g., the NLL loss function), using a metric that does not penalize changes that do not affect meaning, and 2) functional closeness, measured in terms of whether the models are mathematically equivalent or by comparing their behavior on select input sequences. In one embodiment, the neural system may be evaluated on a separate set of examples from those used to train the system.

The syntactic scorer may be generated and existing tools for mathematical equivalence such as SymPy and existing tools and testbeds for behavioral equivalence may be used. In one embodiment, an internal feedback loop may improve results.

Referring to FIG. 5, at block 502, processing logic may transform the binary code into high-level (source) code using a neural decompiler. In one embodiment, processing logic may further generate a low-level abstract syntax tree (AST) corresponding to the high-level code using a natural language processing (NLP)-based transformer to produce a high-level (source code) AST.

At block 504, processing logic may generate one or more sequences of the source code AST. In one embodiment, a polish representation of the source code AST may be used to generate the one or more sequences. In other embodiments, any other representation may be used. At block 506, processing logic may map the sequence based source code AST to a high-level (e.g., Modelica) AST. At block 508, processing logic may parse the high-level model AST into a symbolic (e.g., test) high-level AST. Optionally, processing logic may analyze the test SME interpretable model for syntax errors and compare the test SME interpretable model to the SME interpretable model to determine inconstancies.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 6:
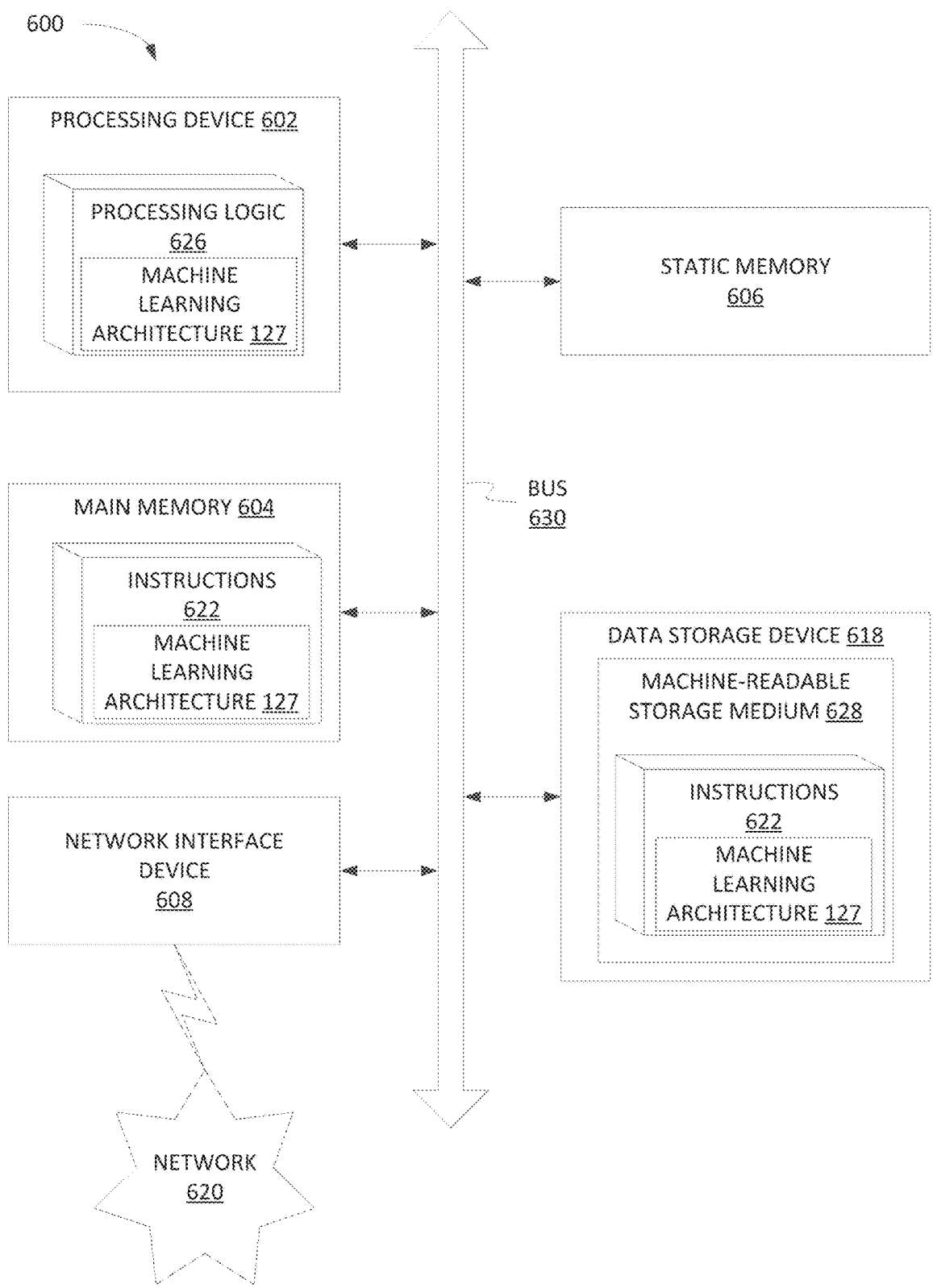
FIG. 6 is an illustration showing an example computing device which may implement the embodiments described herein.

FIG. 6 illustrates a diagrammatic representation of a machine in the example form of a computer system 600 within which a set of instructions 622, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server computer system, such as system 100.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of system 100 shown in FIG. 1, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute system 100. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform the methods and operations described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method, comprising:
   receiving a subject-matter expert (SME) interpretable model;
   converting, by a processing device, the SME interpretable model into a functional mockup unit (FMU);
   integrating the FMU into a control software project (CSP);

compiling the CSP into binary code;
testing a robustness of a feedback controller against reconstruction based on the binary code, wherein testing the robustness of the feedback controller against reconstruction comprises:
transforming the binary code into high-level code using a neural decompiler; and
processing a low-level abstract syntax tree (AST) corresponding to the high-level code using a natural language processing (NLP)-based transformer to produce a high-level AST.

2. The method of claim 1, wherein the SME interpretable model is based on a Modelica language.

3. The method of claim 1, wherein to convert the SME interpretable model into the FMU the method comprises using a functional mockup interface (FMI) standard.

4. The method of claim 1, wherein the CSP is expressed in C++ source code.

5. The method of claim 1, further comprising providing the binary code as training data to a machine learning model trained to reconstruct a firmware of the feedback controller.

6. The method of claim 1, further comprising:
generating a test SME interpretable model from the high-level AST;
analyzing the test SME interpretable model for syntax errors; and
comparing the test SME interpretable model to the SME interpretable model to determine inconstancies.

7. A system comprising:
a memory to store binary code; and
a processing device, operatively coupled to the memory, to:
receive a subject-matter expert (SME) interpretable model;
covert the SME interpretable model into a functional mockup unit (FMU);
integrate the FMU into a control software project (CSP);
compile the CSP into the binary code;
transform the binary code into high-level code using a neural decompiler;
process a low-level abstract syntax tree (AST) corresponding to the high-level code using a natural language processing (NLP)-based transformer to produce a high-level AST; and
test a robustness of a feedback controller against reconstruction based on the binary code.

8. The system of claim 7, wherein the SME interpretable model is based on a Modelica language.

9. The system of claim 7, wherein to convert the SME interpretable model into the FMU the processing device is further to use a functional mockup interface (FMI) standard.

10. The system of claim 7, wherein the CSP is expressed in C++ source code.

11. The system of claim 7, the processing device further to provide the binary code as training data to a machine learning model trained to reconstruct a firmware of the feedback controller.

12. The system of claim 7, wherein to test the robustness of the feedback controller against reconstruction, the processing device is further to:
generate a test SME interpretable model from the high-level AST;
analyze the test SME interpretable model for syntax errors; and
compare the test SME interpretable model to the SME interpretable model to determine inconstancies.

13. A non-transitory computer-readable storage medium having instructions stored thereon that, when executed by a processing device, cause the processing device to:
receive a subject-matter expert (SME) interpretable model;
covert, by the processing device, the SME interpretable model into a functional mockup unit (FMU);
integrate the FMU into a control software project (CSP);
compile the CSP into binary code;
transform the binary code into high-level code using a neural decompiler;
process a low-level abstract syntax tree (AST) corresponding to the high-level code using a natural language processing (NLP)-based transformer to produce a high-level AST; and
test a robustness of a feedback controller against reconstruction based on the binary code.

14. The non-transitory computer-readable storage medium of claim 13, wherein the SME interpretable model is based on a Modelica language.

15. The non-transitory computer-readable storage medium of claim 13, wherein the CSP is expressed in C++ source code.

16. The non-transitory computer-readable storage medium of claim 13, the processing device further to provide the binary code as training data to a machine learning model trained to reconstruct a firmware of the feedback controller.

17. The non-transitory computer-readable storage medium of claim 13, wherein to test the robustness of the feedback controller against reconstruction, the processing device is further to:
generate a test SME interpretable model from the high-level AST;
analyze the test SME interpretable model for syntax errors; and
compare the test SME interpretable model to the SME interpretable model to determine inconstancies.

* * * * *